INVENTORS
JAMES R. KING
JAMES M. KENNEDY

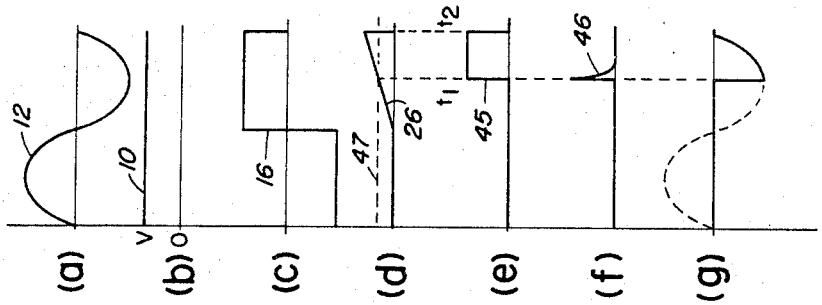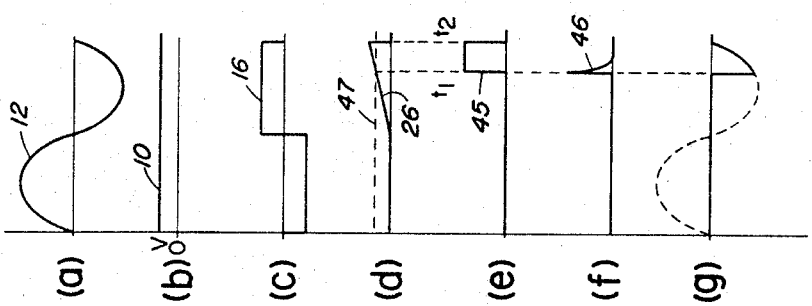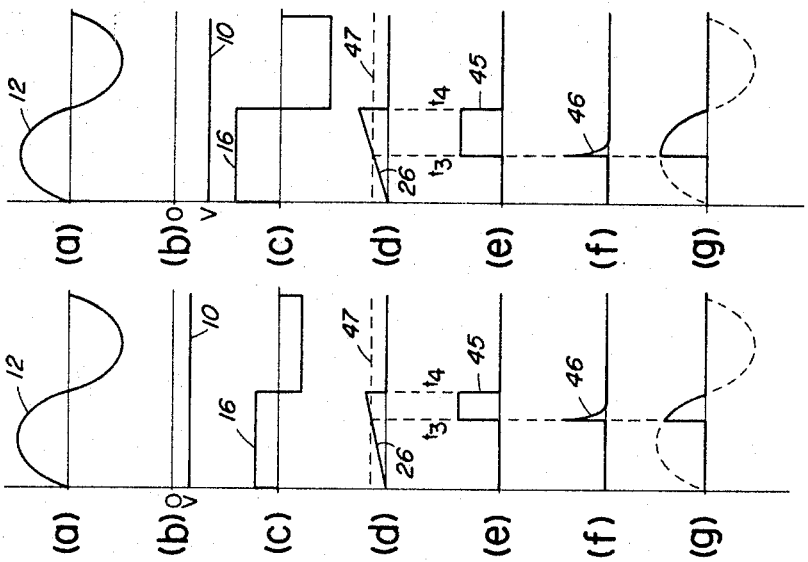

United States Patent Office 3,453,517
Patented July 1, 1969

3,453,517
CONTROL SYSTEM FOR DIRECT CURRENT MOTOR
James M. Kennedy and James R. King, Cedar Rapids, Iowa, assignors to Collins Radio Company, Cedar Rapids, Iowa, a corporation of Iowa
Filed Dec. 1, 1966, Ser. No. 598,237
Int. Cl. H02p 1/22, 3/20; H02k 27/20
U.S. Cl. 318—257                                5 Claims

ABSTRACT OF THE DISCLOSURE

A control system for driving a direct current motor in a direction and at a speed respectively proportional to the polarity and amplitude of a direct current voltage input signal by conversion of the input signal to a repetitive ramp signal the slope and magnitude of which are proportional to the magnitude of the input signal and the time occurrence of which is coincident with one or the other of successive half cycles of an alternating current source depending upon the polarity of the direct current input signal. A trigger pulse is developed upon the ramp signal rising to a predetermined threshold level and is applied to oppositely polarized silicon controlled rectifiers each serially connected with the motor and the alternating current source to gate the alternating current source through the motor for those time intervals between trigger pulse occurrences and next subsequent zero crossings of the alternating current source.

---

Figure 1:
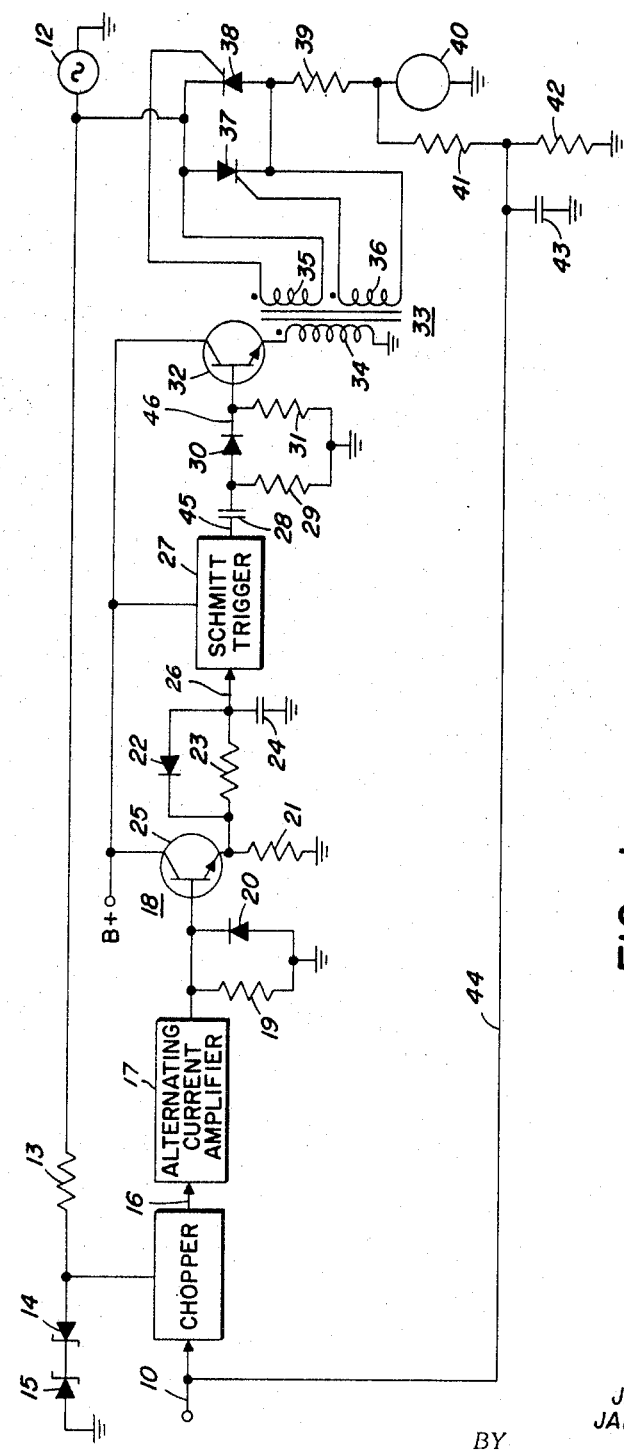

This invention relates generally to servo positioning systems and more particularly to improvements in bidirectional control of direct current motors which might be employed in servo systems.

Direct current servo systems are adaptable to low level power circuitry and to miniaturization since a direct current motor generally produces more power output for a given size, weight and power input than a corresponding alternating current motor. Further, a direct current motor is generally less costly than an alternating current motor of comparable power output. Direct current motors are accordingly desirable for incorporation in servo systems, provided there is an efficient and economical means of controlling the speed and direction of the rotation of the motor. While alternating current motors employed in servo systems may be driven by control of the phase of the power applied thereto, a direct current motor system must incorporate means for reversing a direct current through the motor by varying the magnitude and polarity of either the armature current in the case of a permanent magnet direct current motor, or the field current if the motor employs a field winding.

Means are known in the art to control the speed and direction of rotation of a direct current motor by varying the magnitude and polarity of the armature current. Various electronic switching devices are employed such as thyratrons or silicon controlled rectifiers which are applied in series with the motor armature to switch power to the motor from an alternating current source. Means are provided for controlling the direction of the current flowing through the armature. The speed of the motor is determined by the average DC current through the motor armature and, in systems of this general type, the average current is variable by "commutating" particular time intervals of the alternating current half cycles for application to the armature winding.

The object of the present invention is the provision of direct current motor control systems employing silicon controlled rectifier switches for armature current control in a system which minimizes the control circuitry requirements by an improvement in the method by which the polarity and duty cycle of the silicon controlled rectifier conduction periods are effected and in the methods by which system damping is obtained.

A further object of the present invention is the provision of a DC motor servo control system maximizing the employment of low level circuitry throughout and thereby providing a system readily adaptable to miniaturization.

These and other objects and features of the present invention will become apparent upon reading the following description in conjunction with the accompanying drawings in which:

FIGURE 1 is a functional block diagram of a direct current motor control system in accordance with the present invention; and FIGURES 2, 3, 4 and 5 present operational waveforms illustrating the control principle of the system of FIGURE 1.

The system, as depicted in FIGURE 1 basically drives a direct current motor with direction and speed respectively proportional to the polarity and the magnitude of a direct current input signal. For application in a servo system the motor would position a shaft or other device. The motor might, for example, control the tuning of an oscillator the output of which is compared in a discriminator with a reference signal with the discriminator generating a DC output signal with amplitude and polarity dependent upon the discrepancy between the reference and the controlled variable. The discriminator output would then be applied as an error input signal to the system of FIGURE 1. In a conventional manner the system would operate to null the error signal.

The input DC or error signal 10 is applied to a chopper 11 which converts the DC signal to an AC square wave output 16 the phase of which is dependent upon the polarity of the input signal 10 and the magnitude of which is proportional to the magnitude of the input signal. Chopper 11 is operated at a chopping rate defined by the alternating current source 12 which is converted to a square wave from the network consisting of Zener diodes 14 and 15 and resistor 13. The chopper 11 is thus synchronously driven by a square wave bearing a fixed phase relationship with the alternating current source 12.

The square wave output 16 from chopper 11 is applied to an alternating current amplifier 17 the output of which is applied to a pulse shape converter circuitry 18. The output from the amplifier 17 is applied to the base of transistor 25 of converter circuitry 18. The base is additionally returned to ground through a resistor 19 and a diode 20. The diode 20 is polarized such that the negative half cycles of the alternating current square wave from amplifier 17 are shunted to ground while the positive half cycles thereof are applied to the base of transistor 25. The collector of transistor 25 is connected to a direct current supply source. The emitter of transistor 25 is returned to ground through a resistor 21 and through the series connection of resistor 23 and capacitor 24. Resistor 23 is shunted further by diode 22 the anode of which is connected to capacitor 24. Diode 22 provides a fast discharge both for capacitor 24 through resistor 21 when the output of transistor 25 drops to a low level. This circuit provides the ramp type waveform necessary to insure proper recovery of the Schmitt trigger circuit 27. The output 26 from the pulse-shape converter 18 is taken as the voltage across capacitor 24. Pulse-shape converter 18 converts the square waves applied from amplifier 17 into ramp type waveforms with the slope of the ramp and the peak magnitude of the ramp proportional to the amplitude of the applied signal. Since only the positive half cycles of the square waves are applied to the pulse-shape converter, the ramp is generated during the time intervals corresponding to successive half cycles of the reference alternating current source 12.

The ramp output from the pulse-shape converter is a positive going ramp signal the slope of which is a function of the magnitude of the direct current error input signal 10 and the time occurrence of which is dependent upon the polarity of the direct current input signal 10. The time occurrence is synchronized with a particular half-cycle of the alternating current reference signal 12, depending upon the polarity of the direct current input signal 10.

The output from the pulse shape converter 18 is applied to a Schmitt trigger circuit 27 which, in a known manner, generates an output pulse with the time occurrence of the leading edge defined by the time at which the ramp input 26 reaches a predetermined threshold. The leading edge thus occurs at a time defined by the amplitude of the input signal 10 to the system. The output 45 from Schmitt trigger 27 is differentiated by the RC network comprised of capacitor 28 and resistor 29. The differentiated signal is applied through a diode 30 to pass the positive going spike of the differentiated pulse the time occurence of which is coincident with the leading edge of the Schmitt trigger output pulse. The pulses 46 are applied to a transformer driver circuitry comprised of a transistor 32 and transformer 33. The primary winding 34 of the transformer 33 is connected to the emitter of the transistor 32 and transformer secondary windings 35 and 36 thereof develop firing pulses which are respectively applied as trigger or gating pulses between the control and anode electrodes of the silicon controlled rectifiers 37 and 38. The alternating current reference signal 12 is applied to the anode of the silicon controlled rectifier 37 and the cathode of the silicon controlled rectifier 38. The cathode of the rectifier 37 and anode of the rectifier 38 are connected to a first terminal of the direct current motor 40 through resistor 39. The second terminal of the direct current motor is referenced to ground.

Silicon controlled rectifiers 37 and 38 are thus each serially connected with the direct current motor 40 across the alternating current reference signal 12 in respective opposite polarization. Resistors 39, 41, and 42 and capacitor 43 provide a negative feedback signal 44 for application to the input of the chopper 11. The feedback signal 44 is proportional to the voltage generated across the motor 40. As motor 40 speed increases, the effective impedance increases due to the back EMF of motor 40, thereby increasing the feedback signal 44 due to the reduced voltage drop across resistor 39. This feedback signal is thereby proportional to the rotational speed of motor 40, providing rate feedback and system damping.

The operation of the system may best be comprehended by consideration of the operational waveforms depicted in FIGURES 2, 3, 4 and 5. FIGURES 2 and 3 illustrate operational waveforms for positive polarity input signals 10 of different magnitudes. Waveform (*a*) of FIGURE 2 illustrates the alternating current reference signal 12. Waveform (*b*) illustrate a positive direct current input signal 10 of a particular magnitude. Waveform (*c*) illustrates the resulting output from chopper 11 wherein the input singal 10 is converted to a square wave 16 the amplitude of which is proportional to the magnitude of the direct current signal 10 and the phase of which is seen to be out of phase with the alternating current reference signal 12. Waveform (*d*) illustrates the output from pulse shape converter 18 in response to the square wave input of waveform (*c*).

A voltage amplitude threshold 47 corresponding to the threshold of the Schmitt trigger 27 is depicted in waveform (*d*). Waveform (*e*) illustrates the Schmitt trigger output pulse 45 with leading edge occurring at a time $T_1$ defined by the time at which the magnitude of the ramp signal 26 reaches the Schmitt trigger threshold level 47. Waveform (*f*) illustrates the firing pulse 46 as applied to the driver circuit 33 which is time coincident with the leading edge of the Schmitt trigger output pulse 45. Waveform (*g*) illustrates the current through the motor 40 as being a portion of each negative half-cycle of the alternating current reference 12 corresponding to the time duration of the Schmitt trigger output pulse 45.

The current waveform (*g*) is controlled by the firing time of one of the two controlled rectifiers 37 and 38. In the case of a positive input error signal it is noted that the Schmitt trigger signal 45, and thus the firing pulse 46, occurs during the negative half-cycle of the alternating current reference 12. The firing pulse is applied through the transformer secondary windings 35 and 36 simultaneously across the anode-gate junctions of both rectifiers 37 and 38. However, silicon controlled rectifiers fire only when their anode-cathode junction is forward biased at the time a positive gate pulse is applied to the gate electrode. Silicon controlled rectifiers continue to fire once gated-on until the forward bias across the anode-cathode junction is removed. In the case of a positive direct current input error signal, the firing pulse occurs somewhere within the negative half-cycle of the alternating current reference signal 12. During this negative half-cycle only controlled rectifier 38 may be gated-on since controlled rectifier 37 is back-biased by the reference 12. Thus, at time $T_1$, rectifier 38 fires to apply the AC reference signal 12 to the motor 40 allowing current to flow through the motor armature winding until the alternating current source 12 passes through zero and at which time controlled rectifier 38 drops out of conduction. The motor current, as depicted in waveform (*g*) of FIGURE 2, is thus a series of negative pulses each defined as a predetermined portion of the negative half-cycle of alternating current reference signal 12, and the motor is driven in a direction at a speed defined by the polarity of direction of the current flow, and at a speed proportional to the average power applied.

FIGURE 3 illustrates operational waveforms for the development of the motor control current in response to positive direct current error signal input of a greater magnitude than that depicted in FIGURE 2. Here it is noted that the chopper output 16 remains out of phase with the alternating current reference 12 but the amplitude of the square wave is proportionally greater. From waveform (*d*) of FIGURE 3 it is seen that the ramp signal from the pulse shape converter 18 has proportionally greater slope and amplitude, thus intersecting the Schmitt trigger threshold level 47 at a time $T_1$ earlier in the negative half-cycle of the alternating current reference signal 12. The leading edge of the Schmitt trigger pulse, as shown in waveform (*e*), occurs sooner in time. The firing pulse 46 accordingly occurs sooner in time, and a proportionally greater portion of the negative half-cycle of the alternating current reference signal 12 is applied to the motor. The average power is increased and the motor is driven at a higher speed.

FIGURES 4 and 5 illustrate direct current error input signals of opposite or negative polarity, in which case it is noted that the phase of the square wave output 16 from the chopper 11 is reversed. The ramp signal from the pulse-shape converter now is generated in the positive half-cycle period of the alternating current reference 12 and the Schmitt trigger pulse occurs between times $T_3$ and $T_4$; thus negative input signal develops a firing pulse 46 the time position of which lies within the positive half-cycles af alternating current reference signal 12, and silicon controlled rectifier 37, which is polarized opposite that of rectifier 38, is forward biased by reference 12 at the time occurrence of the trigger pulses 46 and thus rendered conductive to apply portions of the positive half-cycles of alternating current reference 12 to the motor 40. Current thus flows through the motor armature windings in the opposite direction and the rotation is reversed.

The present invention is thus seen to provide a means for bidirectional proportional control of a direct current motor by control of the polarity and duty cycles of the conduction periods of silicon controlled rectifiers in a system in which all circuitry, with the exception of the silicon controlled rectifiers, is low level power circuitry.

Although the present invention has been described with respect to a particular embodiment thereof it is not to be so limited as changes might be made therein which fall within the spirit and scope of the invention as described in the appended claims.

We claim:
1. Means for driving a direct current motor with direction and speed proportional respectively to the polarity and magnitude of a direct current voltage signal, said direct current motor comprising an armature winding and a field winding; comprising signal chopping means to which said direct current signal is applied, said chopping means operating synchronously at a chopping rate defined by the frequency of an alternating current reference signal and developing an output signal in the form of a square wave alternating signal the frequency of which is defined by said alternating current reference signal and the phase of which is respectively in-phase and 180° out of phase with said reference signal in response to input direct current voltage signals having negative and positive polarities respectively, pulse-shape converting means receiving said alternating current square wave signal and developing a repetitive ramp type output signal each occurrence of which is time coincident with successive positive half-cycles of the square wave input thereto with slope directly proportional to the magnitude of said square wave input signals thereto, trigger development circuitry receiving said ramp signal and producing an output trigger pulse the time occurrence of the leading edge of which is defined by the magnitude of said ramp input signal equaling a trigger threshold voltage, first and second controlled rectifiers each respectively serially connected with at least one of said direct current motor windings and said alternating current reference signal, said first and second controlled rectifiers being respectively parallel connected in mutually opposite polarization, means for applying said trigger pulse simultaneously to the control electrode of each of said control rectifiers whereby predetermined increments of said reference signal are applied to the connected one of said direct current motor windings between the period of time defined by said trigger pulse occurrence and the subsequent zero crossing of said alternating current reference signal.

2. A control circuitry as defined in claim 1 wherein said trigger circuitry comprises a Schmitt trigger circuit, the output of said trigger circuit applied to a signal differentiator, said differentiator developing said trigger pulse when the amplitude of said ramp signal reaches the threshold of said Schmitt trigger circuit.

3. Circuitry as defined in claim 2 wherein said means for applying said trigger circuit simultaneously to the control electrode of each of said first and second controlled rectifiers comprises a transformer the primary winding of which receives said trigger signal, said transformer comprising first and second like polarized secondary windings respectively connected with like polarization across the gate-cathode junctions of said first and second controlled rectifiers.

4. Control circuitry as defined in claim 3 further comprising first and second resistors serially connected across said connected winding of said motor, a capacitor shunting said second resistor, input signal combining means, the junction between said first and second resistors being connected to said combining means as a first input thereto, said direct current signal being applied as a second input to said combining means, and the output of said combining means connected to the input of said signal chopping means, whereby a rate damping feedback signal is applied to the input of said control circuitry the magnitude of which is proportional to the speed of rotation of said motor.

5. Control circuitry as defined in claim 4 wherein said pulse shape-converting means comprises a transistor the base of which receives said alternating current square wave signal, a diode connected between the base of said transistor and common ground, said diode being polarized to shunt the negative half-cycle of said square wave signal to ground, the emitter of said transistor being connected through a first resistor to ground and serially through a second resistor and capacitor respectively to ground, a second diode shunting said second resistor with the cathode of said second diode connected to the emitter of said transistor and the anode connected to the junction between said second resistor and said capacitor, said output ramp signal being developed as the voltage across said capacitor.

References Cited
UNITED STATES PATENTS

| | | | |
|---|---|---|---|
| 3,105,179 | 9/1963 | Young et al. | 318—507 |
| 3,249,840 | 5/1966 | Eriksson et al. | 318—345 |
| 3,308,307 | 3/1967 | Moritz | 318—345 |
| 3,355,643 | 11/1967 | Benson | 318—257 |

ORIS L. RADER, *Primary Examiner.*

K. L. CROSSON, *Assistant Examiner.*

U.S. Cl. X.R.

318—341, 507